(12) United States Patent
Hioki et al.

(10) Patent No.: US 8,496,369 B2
(45) Date of Patent: Jul. 30, 2013

(54) DISPLAY ELEMENT AND DISPLAY DEVICE

(75) Inventors: Tsuyoshi Hioki, Kanagawa-ken (JP); Yutaka Nakai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 13/045,222

(22) Filed: Mar. 10, 2011

(65) Prior Publication Data
US 2012/0033432 A1    Feb. 9, 2012

(30) Foreign Application Priority Data
Aug. 3, 2010   (JP) ................................. 2010-174285

(51) Int. Cl.
*F21V 7/04*   (2006.01)

(52) U.S. Cl.
USPC ......................................... 362/609; 362/561

(58) Field of Classification Search
USPC .......................... 362/608, 609, 623, 561, 616
See application file for complete search history.

(56) References Cited

U.S. PATENT DOCUMENTS

| | | | |
|---|---|---|---|
| 7,903,916 B2 | 3/2011 | Hioki et al. | |
| 2007/0274094 A1* | 11/2007 | Schultz et al. | 362/601 |
| 2009/0243980 A1 | 10/2009 | Nakai et al. | |
| 2009/0257108 A1* | 10/2009 | Gruhlke et al. | 359/290 |
| 2009/0316388 A1* | 12/2009 | Chang | 362/97.1 |
| 2009/0322736 A1 | 12/2009 | Hioki et al. | |
| 2010/0177091 A1 | 7/2010 | Hioki et al. | |

FOREIGN PATENT DOCUMENTS

| | | |
|---|---|---|
| JP | 11-218842 | 8/1999 |
| JP | 11-258558 | 9/1999 |
| JP | 2002-100225 A | 4/2002 |
| JP | 2003-524215 A | 8/2003 |
| JP | 2005-227324 | 8/2005 |
| WO | WO 01/63588 A1 | 8/2001 |
| WO | WO 2009/079414 A1 | 6/2009 |

OTHER PUBLICATIONS

U.S. Appl. No. 13/242,087, filed Sep. 23, 2011, Hioki, et al.
U.S. Appl. No. 12/979,902, filed Dec. 28, 2010, Yutaka Nakai et al.
Office Action issued Jul. 20, 2012 in Japanese Patent Application No. 2010-174285 with English language translation.

* cited by examiner

*Primary Examiner* — Anh Mai
*Assistant Examiner* — Andrew Coughlin
(74) *Attorney, Agent, or Firm* — Oblon, Spivak, McClelland, Maier & Neustadt, L.L.P.

(57) ABSTRACT

A display element includes a light source, an optical waveguide, a light-extracting portion. The optical waveguide has two ends and a side surface. One of the two ends is near the light source. The other of the two ends is far from the light source. The side surface extends from the one end to the other end. The light-extracting portion is provided near the side surface to extract light out of the optical waveguide. In addition, the other end changes a light path of forth-traveling light so that an incident angle of back-traveling light is smaller than the incident angle of the forth-traveling light.

6 Claims, 9 Drawing Sheets

DISPLAY ELEMENT AND DISPLAY DEVICE

CROSS REFERENCE TO RELATED APPLICATION

This application is based upon and claims the benefit of priority from the prior Japanese Patent Application No. 2010-174285, filed on Aug. 3, 2010, the entire contents of which are incorporated herein by reference.

FIELD

Embodiments are related basically to a display element and a display device.

BACKGROUND

Today there is widely used a FPD (Flat Panel Display) as a display device, which has a large display surface and is relatively thin to the display surface. FPDs are categorized on the basis of their display principles as LCDs (Liquid Crystal Displays), PDPs (Plasma Display Panels), OLEDs (Organic Light Emitting Displays), FEDs (Field Emission Displays) etc. These are employed for outside ads displays, flat TVs, mobile phones, portable music players, and so on. The screen size of FPDs is chosen depending on each usage environment. However, these display devices are manufactured using supporting substrate such as a glass, thereby leading to restriction of the screen size due to the size of the supporting substrate to be manufactured.

Then a novel display device has been studied, which are formed of two or more display elements including optical waveguides as components to be aligned. The novel display device includes light sources, two or more aligned optical waveguides, and two or more light-extracting portions provided to side surfaces of the respective waveguides. The light-extracting portions extract light out of the optical wave guides confining the light thereto.

BRIEF DESCRIPTION OF DRAWINGS

Aspects of this disclosure will become apparent upon reading the following detailed description and upon reference to accompanying drawings. The description and the associated drawings are provided to illustrate embodiments of the invention and not limited to the scope of the invention.

DESCRIPTION

As will be described below, according to an embodiment, a display element includes a light source, an optical waveguide, and a light-extracting portion. The optical waveguide has two ends and a side surface. One of the two ends is near the light source to be irradiated with light of the light source. The other of the two ends is far from the light source. The side surface extends from the one of the two ends to the other of the two ends so that the optical waveguide guides forth-traveling light undergoing total internal reflections at the side surface from the one of the two ends to the other of the two ends and back-traveling light undergoing total internal reflections at the side surface from the other of the two ends to the one of the two ends. The light-extracting portion is provided near the side surface to extract light out of the optical waveguide. In addition, the other of the two ends changes a light path of the forth-traveling light so that an incident angle of the back-traveling light to totally reflect at the side surface is smaller than the incident angle of the forth-traveling light to totally reflect at the side surface.

First Embodiment

A display device according to a first embodiment will be described below.

Figure 1:
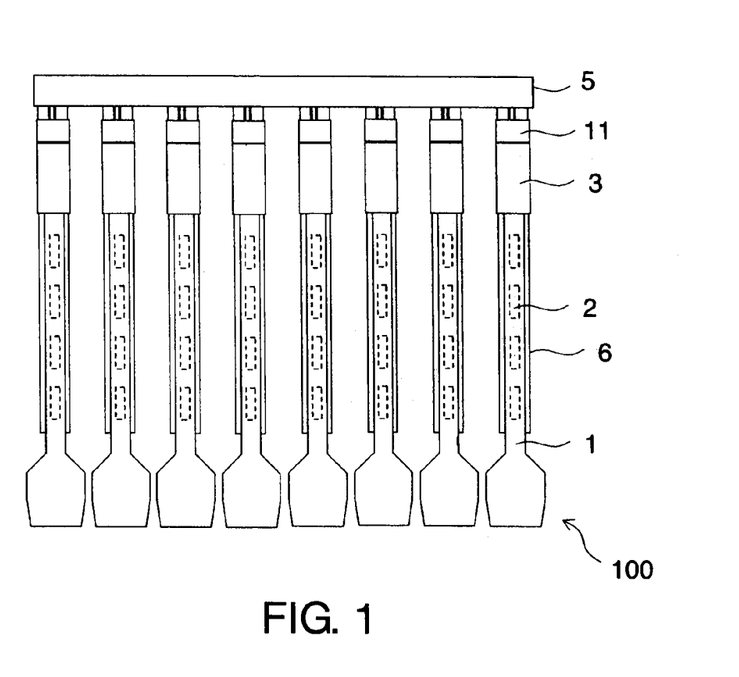
FIG. 1 is a plan view showing a display device according to a first embodiment.

FIG. 1 is a plan view showing the display device which is formed of two or more display elements including optical waveguides to be aligned. The display device is provided with two or more display elements 100 arranged parallel and a drive circuit 5. One display element 100 includes light sources 11, columnar optical waveguides 1, circuit boards 6, and light-extracting portions 2. The light source 11 is connected to the drive circuit 5. The optical waveguide 1 is linked with the light source 11 via a hollow optical guiding tube 3. The circuit board 6 faces a side surface of the optical waveguide 1 and is connected to the drive circuit 5. The light-extracting portions 2 are provided to a main surface of the circuit board 6, which faces the side surface of the optical waveguide 1. The light-extracting portion 2 and the circuit board 6 are provided to the same side of the optical waveguide 1. The optical waveguide 1 can have various shaped-sections cut perpendicularly to the longitudinal direction thereof. The sections are a circle, a square, and an ellipse in shape, for example. The optical waveguide 1 having a circular section shall be employed in this embodiment.

Figure 2:
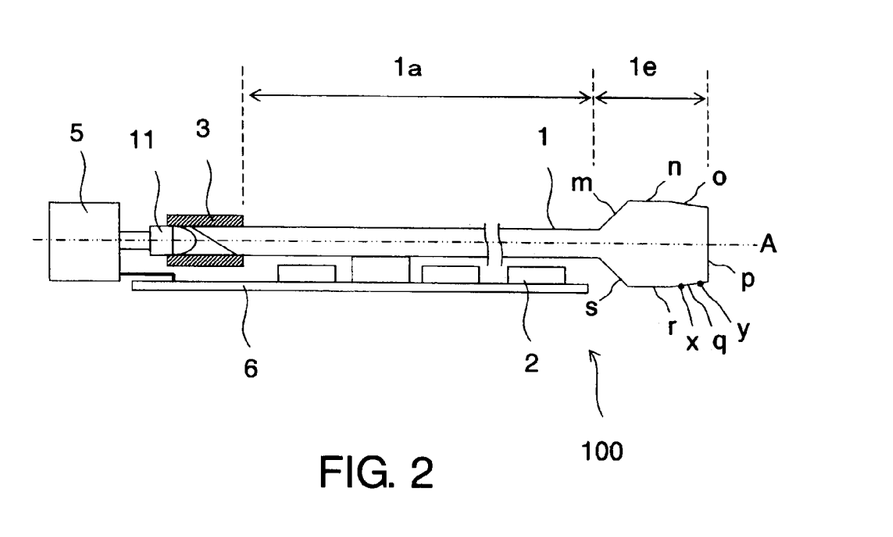
FIG. 2 is a view showing a cross-section cut parallel to a longitudinal direction of the display element.

FIG. 2 is a view showing a cross-sectional configuration of the display element 100 parallel to its longitudinal direction. The cross-section includes an axis A being parallel to the longitudinal direction of a side surface portion 1a of the optical waveguide 1 and passing through the center of a cross section cut perpendicularly to the longitudinal direction.

The end face of the optical waveguide 1 on the side of the light source 11 is inclined at an angle ω to a plane perpendicular to the longitudinal direction of the optical waveguide 1. The side surface of the optical waveguide 1 is covered as a whole with the optical guiding tube 3 to allow light emitted from the light source 11 to be efficiently incident onto the optical waveguide 1.

Once light enters the optical waveguide 1 from one end thereof to repeat total internal reflections at the side surface portion 1a, the light travels back and forth between the one end (one of the two ends) and the other end portion 1e (the other of the two ends). Light to be guided from the end near the light source to the other end portion 1e of the optical wave guide 1 therein is referred to as "forth-traveling light." Light to be guided from the other end portion 1e to one end of the optical waveguide 1 therein is referred to as "back-traveling light." The other end portion 1e of the optical waveguide 1 changes the traveling direction of light so that an incident angle of the forth-traveling light to be totally reflected at the end portion 1e is larger than that of the back-traveling light to be totally reflected at the end portion 1e.

A directive light emitting diode (LED) is employed for the light source 11, for example. An aluminum tube having a mirror-polished inside surface is employed for the optical guiding tube 3, for example. Materials are employed for the optical waveguide 1, which are transparent to light emitted from the light source 11 such as an acrylic resin made of poly methyl methacrylate (PMMA). An acrylic resin has a refractive index of about 1.5.

For example, if M light sources 11 and N light-extracting portions 2 per optical waveguide 1 are provided, the display device can display an image of M×N pixels. The drive circuit 5 selects some or all of two or more light sources 11 to make the selected light sources 1 emit light. The light emitted by the selected light source 1 enters one end of the optical waveguide 1 on side of the light source to travel toward the other end thereof on the side far from the light source 1 while undergoing total internal reflections at its side surface thereof.

Moreover, N light-extracting portions 2 provided to face an optical waveguide 1 shall form one line. The drive circuit 5 selects a line of the M lines and supplies an electric signal to the light-extracting portions 2 provided to the line via the circuit board 6 to switch between extraction and nonextraction of light from each light-extracting portion 2. The light-extracting portion 2 changes into the extraction of light to make the light source connected to the optical waveguide 1 facing the light-extracting portion 2 emit light. The light is extracted from the light-extracting portion 2. In the same way, the drive circuit 5 switches the respective lines from the first to the M-th line to scan, thereby displaying an image.

For example, FIG. 2 shows 4 lines of the light-extracting portions 2. In FIG. 2, the second light-extracting portion 2 from the left is in the extraction of light and the other 3 portions 2 are in the nonextraction of light. The light-extracting portion 2 to which an electric signal has been supplied raises its upper surface to contact the optical waveguide 1. The operation of the light-extracting portion 2 will be explained in detail with reference to FIGS. 3A and 3B.

The other end portion 1e of the optical waveguide 1 includes two circular truncated cones (a first circular truncated cone, a second circular truncated cone) and a pillar portion inserted therebetween. That is, the second circular truncated cone, the pillar portion, and the first circular truncated cone in this order in a direction away from the light source 11. The cross section of the other end portion 1e cut along the longitudinal direction of the optical waveguide 1 includes 7 sides (m, n, o, p, q, r, and s). The first circular truncated cone has a side surface whose generatrices are the side o and the side p, and a circular bottom face having the side p. The pillar portion has a side surface with the side n and the side r as busses. The second circular truncated cone has a side surface with the side m and the side s as busses, and is connected to the side surface portion 1a of the optical waveguide 1.

The busses o and q of the side surface of the circular first truncated cone of the other end portion 1e are inclined to the axis A of the optical waveguide 1. One of the busses o and q which is farther from the light source 11 is closer to the axis A. If distances of two arbitrary points (x, y) on the curved surface of the other end portion 1e from the light source 11 are different, the distance between the point x nearer the light source 11 and the axis A of the optical waveguide 1 is longer than the distance between the point y farther from the light source 11 and the axis A thereof.

The area of the cross section passing through the point x and perpendicular to the axis A is larger than the area of the cross section passing through the point y and perpendicular thereto.

Figure 3A:
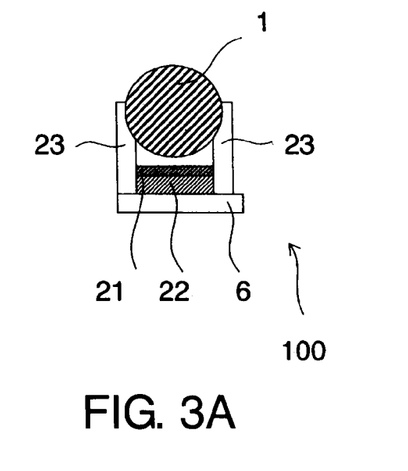
FIGS. 3A and 3B are views showing cross-sections cut along a direction perpendicular to the longitudinal direction of an optical waveguide of the display element according to the first embodiment.
Figure 3B:
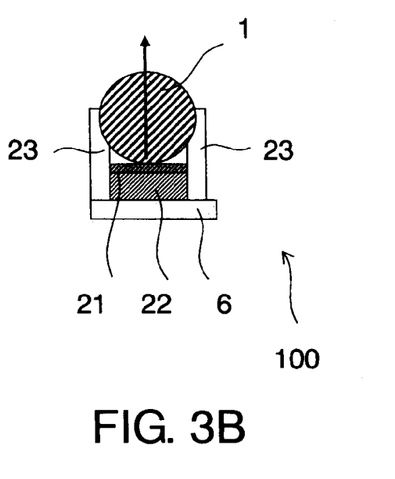

FIGS. 3A and 3B are views showing cross-sections of the light-extracting portion 2 cut along a direction perpendicular to the longitudinal direction of the optical waveguide 1. FIGS. 3A and 3B show the light-extracting portion 2 in nonextraction and extraction of light, respectively. The light-extracting portion 2 includes a light extraction layer 21, a displacement element 22, and spacers 23. The displacement element 22 is a member to generate a volume change in accordance with a voltage to be applied, for example. The displacement element 22 and the light extraction layer 21 are laminated on the circuit board 6. Both ends of the displacement element 22 and the light extraction layer 21 are sandwiched between the two spacers 23. The spacers 23 are taller than the total thickness of the displacement element 22 and the light extraction layer 21. The optical waveguide 1 is provided on the two spacers 23.

An electric signal is supplied from the drive circuit 5 to the displacement element 22 through the circuit board 6 and generates an electric field to be applied to the displacement element 22. As a material of the displacement element 22, ferroelectric lead zirconium titanate is employed. As the light extraction layer 21, a material is employed of which refractive index is higher than that of the optical waveguide 1. The material is a polyethylene resin film including titanium oxide particles dispersed therein. The polyethylene resin film and the titanium oxide particles have refractive indexes of about 1.53 and 2, respectively. A 100 nm-thick aluminum layer is formed on the surface of the light extraction layer 21, the surface facing the displacement element 22.

When no electric signal is supplied from the drive circuit 5 to the displacement element 22, a gap is formed between the light extraction layer 21 and a bottom surface of the optical waveguide 1 as shown in FIG. 3A. An upper surface of the optical waveguide 1 is exposed to the air, the upper surface not being in contact with the light extraction layer 21.

An electric signal is supplied to the light-extracting portion 2 from the drive circuit 5 to make the displacement element 22 thicker as shown in FIG. 3B than as shown in FIG. 3A. The displacement element 22 becomes thicker to lift the light extraction layer 21 so that the light extraction layer 21 is in contact with the bottom face of the optical waveguide 1. At this time, the light extraction layer 21 having a refractive index different from that of the air is deemed to locally be on a side surface of the optical waveguide 1. Here, the linear arrow denotes a path of light to be extracted in FIG. 3B. Guided light to be extracted out of the optical waveguide 1 will be shown in detail below.

Figure 4:
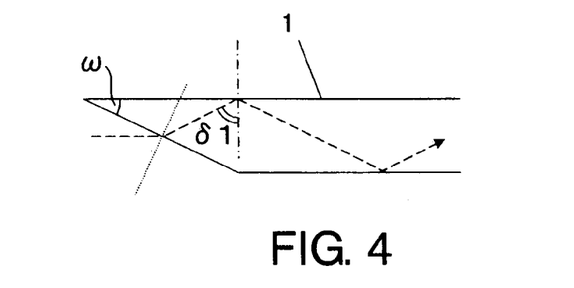
FIG. 4 is a sectional view showing an end face of the optical waveguide of the display element according to the first embodiment.

FIG. 4 is an enlarged sectional view showing an end face of the optical waveguide of the display element according to the first embodiment. The end face of the optical waveguide 1 on the side of the light source 11 is inclined at an angle ω. Therefore, light traveling parallel to the longitudinal direction of the optical waveguide 1 is incident on the end face to be refracted thereat, thereby allowing the light to enter the inside of the optical waveguide 1. The light is incident on a side surface of the optical wave guide 1 at an angle of δ1 inside the optical waveguide 1. Here, the side surface forms an interface between the optical waveguide 1 and the air. Both the optical waveguide 1 and the air have refractive indexes different from each other. If the angle δ1 is larger than a critical angle, the light having entered the optical waveguide 1 repeats total internal reflections at the side surface thereof to travel inside the optical waveguide 1 while sustaining the conditions of total internal reflections. The critical angle θ1 for the total internal reflection to take place is generally expressed with the following equation 1, provided that the refractive index of the optical waveguide 1 and the air (or other gases) are denoted by n1 and n2, respectively.

$$n1 \cdot \sin\theta1 = n2 \cdot \sin\frac{\pi}{2}$$ [Equation 1]

In this embodiment, when n1 is about 1.5 and n2 is about 1, θ1 is calculated to be about 41.8°.

Figure 5:
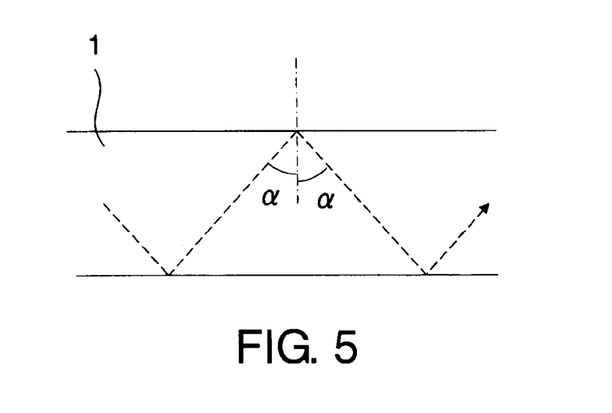
FIG. 5 is a schematic view showing an example of a light path along which light is incident on the side surface of the optical waveguide to be totally reflected therein.
Figure 6:
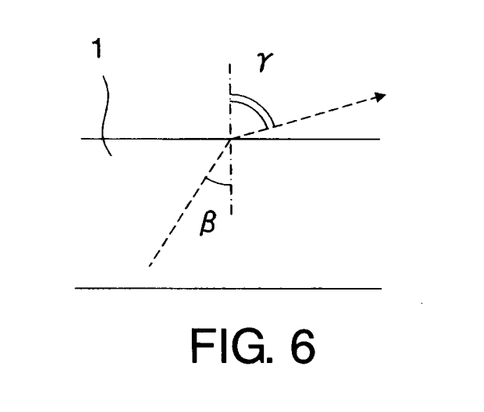
FIG. 6 is a schematic view showing an example of a light path along which light is incident on the side surface of the optical wave guide according to the first embodiment to be refracted thereat.

FIG. 5 is a schematic view showing an example of a light path along which light is incident on the side surface of the optical waveguide to be totally reflected therein. FIG. 6 is a schematic view showing an example of a light path along which light is incident on the side surface of the optical waveguide 1 to be refracted toward outside. If the incident angle α at the side surface of the optical waveguide 1 is larger than the critical angle (α>θ1), a condition of a total internal reflection is met to allow the total internal reflection at the interface between the optical wave guide 1 and the air. On the other hand, as shown in FIG. 6, if the incident angle β is smaller than the critical angle (β<θ1), light is refracted so that the light is emitted from the side surface toward the air.

In the embodiment, light entering one end (one of the two ends) of the optical wave guide 1 to be guided to the other end portion 1e (the other of the two ends) will be referred to as "forth-traveling light." Light being reflected at the other end portion 1e to be guided to the one end thereof will be referred to as "back-traveling light."

Figure 7:
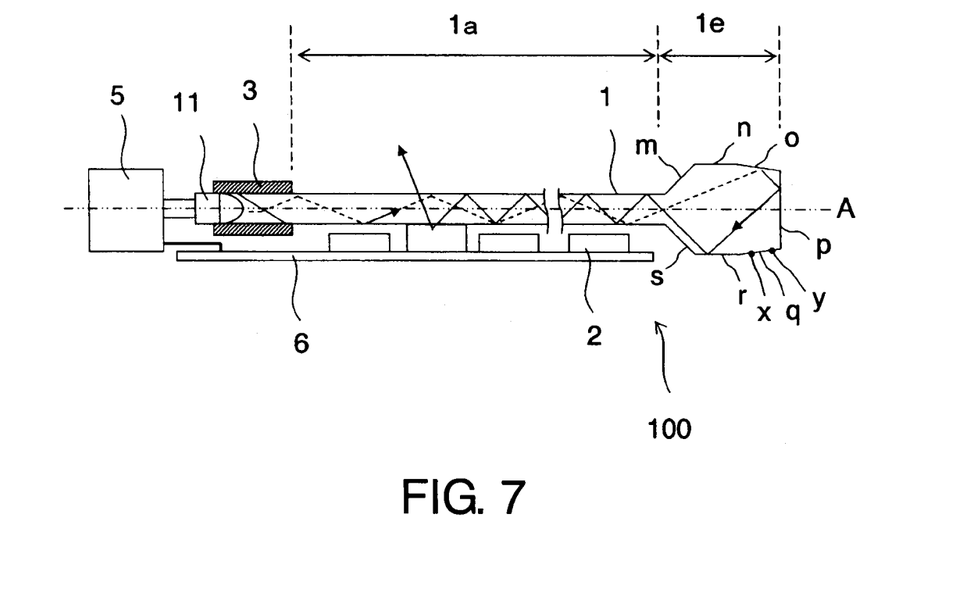
FIG. 7 is a view showing an example of a light path of the forth-traveling light and back-traveling light forth-traveling light inside the optical waveguide according to the first embodiment.

The dashed line shown in the optical waveguide 1 in FIG. 7 schematically shows an example of the path of the forth-traveling light. The solid line shows an example of the path of the back-traveling light. An electric signal is supplied to the light-extracting portion 2 to be changed into light extraction, thereby making the light extraction layer 21 in contact with a side surface of the optical waveguide 1 as mentioned above. At this time, light does not undergo the total internal reflection at the area where the light-extracting portion 2 and the optical waveguide 1 are in contact with each other.

The light entering the light extraction layer 21 from the optical waveguide 1 repeats refractions and total internal reflections to change the traveling direction thereof. A portion of the light is extracted out of the optical waveguide 1 as shown in FIG. 7. In this way, the light-extracting portion 2 to be selected breaks locally total internal reflection conditions of the light to be guided inside the optical waveguide 1 at the contact area, thereby allowing it to extract the light out of the optical waveguide 1.

Light to be extracted out of the display element 100 is limited to a portion of the light guided inside the optical waveguide 1 to be incident on the contact area where the side surface of the optical waveguide 1 and the light extraction layer 21 are in contact with each other. Light traveling inside the optical waveguide 1 has various paths as a result of the directivity of the light source 11. Therefore, a portion of the light entering the optical waveguide 1 from one end of the optical waveguide 1 travels to the other end portion 1e thereof without being extracted from the contact area.

Figure 8:
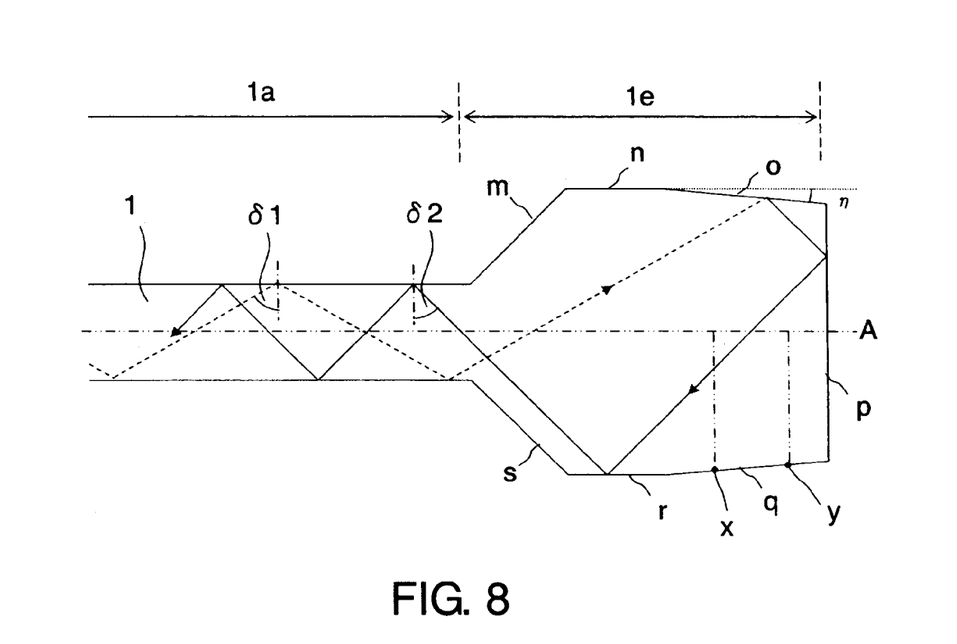
FIG. 8 is an enlarged view showing other end portion of the optical waveguide according to the first embodiment.

FIG. 8 is an enlarged view showing an example of a light path inside the other end portion 1e of the optical waveguide 1. In FIG. 8, the dashed line denotes forth-traveling light and the solid line denotes back-traveling light as well as in FIG. 2. The incident angle of back-traveling light at the side surface of the optical waveguide 1 is referred to as δ2. An inclined curved-surface is provided to the other end portion 1e. As described above, the inclined curved-surface has the side o and the side q so that a point farther from the light source is nearer the axis A of the optical wave guide 1. The angle between the bus line of the curved-surface and the side surface or the axis A of the optical waveguide 1 is referred to as η.

As a result of the inclined curved-surface, the incident angle δ1 of the forth-traveling light incident on the side surface of the optical waveguide 1 is different from the incident angle δ2 of the back-traveling light. Here, the forth-traveling light is reflected at the inclined curved-surface. That is, δ2=δ1·2η and the incident angle δ2 of the back-traveling light is smaller than the incident angle δ1 of the forth-traveling light.

Figure 9:
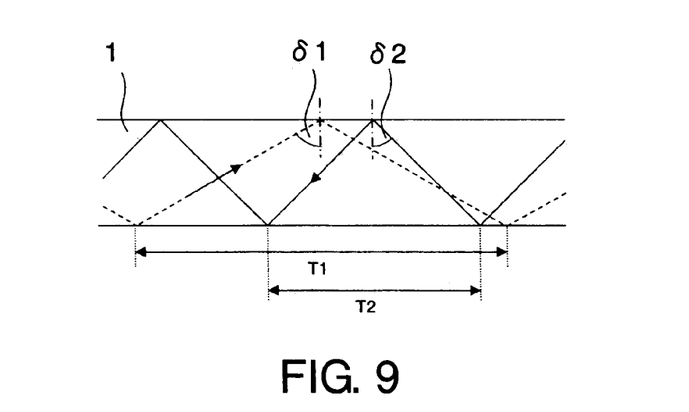
FIG. 9 is a view showing an example of a light path of forth-traveling light and back-traveling light traveling inside the optical waveguide according to the first embodiment.

FIG. 9 is a view showing an example of the light path of the forth-traveling light and back-traveling light traveling inside the optical waveguide 1. The distance for a period is assumed to be T. The back-traveling light has an incident angle smaller than that of the forth-traveling light, thereby making the one-period distance T2 of the back-traveling light shorter than the one-period distance T1 of the forth-traveling light. Therefore, the light path of the back-traveling light can be made to be longer than that of the forth-traveling light.

Therefore, when changing one light-extracting portion 2 into extraction of light to make the light extraction layer 21 in contact with the side surface of the optical waveguide 1, the back-traveling light is more likely to be incident on the contact area of the light extraction layer 21 even if the forth-traveling light fails to be incident thereon. That is, the light extraction efficiency can be higher when the one-period distance T2 of the back-traveling light is shorter than the one-period distance T1 of the forth-traveling light for one period than when both the one-period distances are equal to each other.

Figure 10:
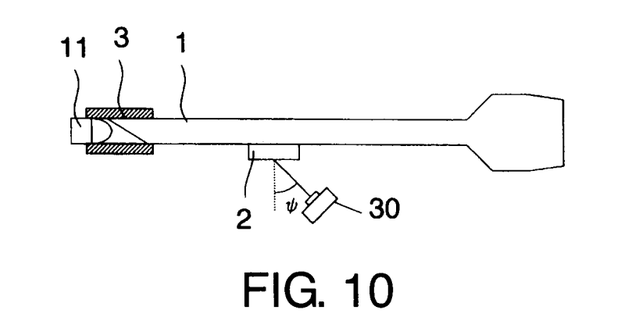
FIG. 10 is a view showing a spatial relation between a display element and a light receiving element 30 to be set for an optical simulation of the optical waveguide according to the first embodiment.

An optical simulation will be explained of angle dependence of intensity for light extracted from the light-extracting portion 2. FIG. 10 is a view showing a spatial relation between a display element and a light receiving element 30 to be set for the optical simulation. In FIG. 10, an angle between the detection direction of the light receiving element 30 and a direction perpendicular to the side surface of the optical waveguide is set to ψ. Therefore, in FIG. 10, a positive angle ψ represents an extraction direction of light dominantly including the forth-traveling light component and a negative ψ represents an extraction direction of light dominantly including the back-traveling light component.

Figure 11:
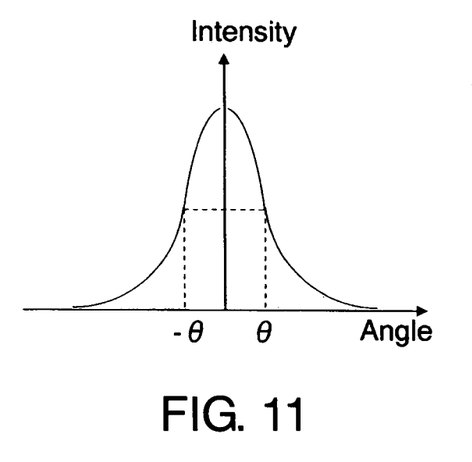
FIG. 11 is a view showing directivity of a light source employed for the optical simulation according to the first embodiment.
Figure 12:
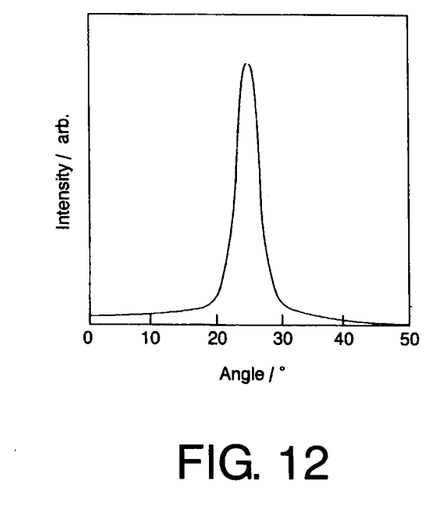
FIG. 12 is a view showing a relation between an incident angle and intensity of light having entered the optical wave guide according to the first embodiment.

FIG. 11 is a view showing directivity of the light source 11. The light source 11 has peak brightness at a wavelength of 520 nm and the directivity thereof is set as shown in FIG. 11. In addition, in FIG. 11, θ is a value defined as a full width at half maximum (FWHM) angle to be set to 30°. Furthermore, an inclined angle of the end face of the optical waveguide 1 on the side of the light source 11 in FIG. 10, i.e., ω in FIG. 4 is set to 30°. In addition, FIG. 12 is a view showing a relation between a total internal reflection angle $\delta_1$ in FIG. 9) and intensity of the forth-traveling light having the total internal reflection angle.

Figure 13:
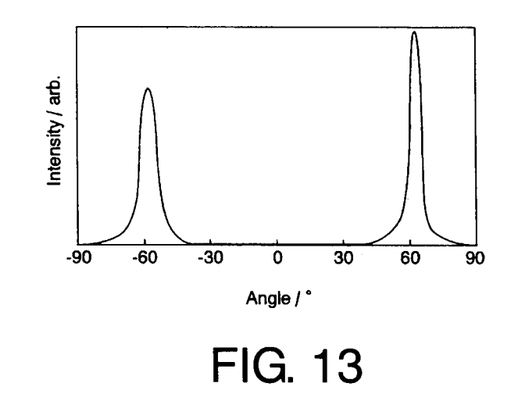
FIG. 13 is a view showing angular dependence of extracted light intensity obtained using the optical simulation according to the first embodiment.

FIG. 13 is a view showing angular dependence of the extracted light intensity obtained using the optical simulation of the light receiving element in FIG. 10. In addition, in FIG. 13, the horizontal axis denotes the angle ψ as well as in FIG. 10 and the vertical axis denotes relative light intensity of extracted light. Here, the light intensity in a positive region of ψ comes dominantly from the forth-traveling light to be extracted and the light intensity in a negative region of ψ comes dominantly from the back-traveling light to be extracted. As shown in FIG. 13, the light intensity detected by the light receiving element 30 has one peak on each of the positive and negative ψ regions. A comparative example of the optical waveguide with "perpendicular" other end portion will be described in order to examine the light intensity in FIG. 13.

Figure 14:
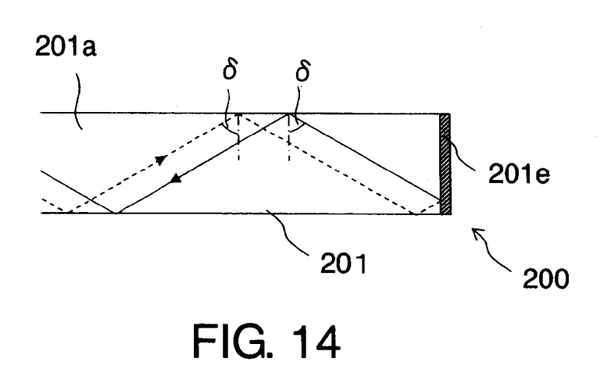
FIG. 14 is a view showing other end portion of an optical waveguide of a comparative example according to the first embodiment.

FIG. 14 is a view showing a display element 200 of which other end portion 201e is perpendicular to a side surface of an optical waveguide 201. The interface of the other end portion 201e includes a 200 nm-thick aluminum film prepared by vacuum evaporation to allow a mirror reflection. All portions except for the other end portion 201e of the optical waveguide 201 are the same as those employed for the above-mentioned simulation. Explanations on the same portions will be omitted.

Figure 15:
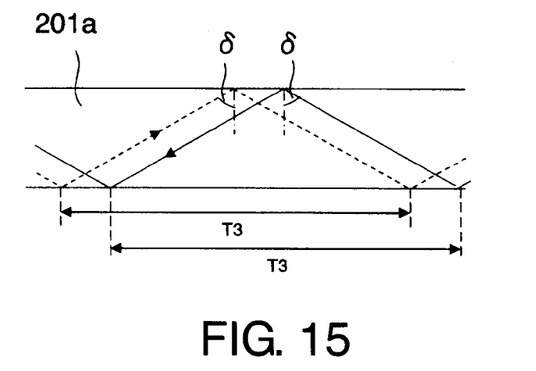
FIG. 15 is a schematic view showing forth-traveling light and back-traveling light to be guided inside the optical waveguide according to the comparative example.

FIG. 15 is a schematic view showing forth-traveling light and back-traveling light to be guided inside the optical waveguide 201 of the display element 200 shown in FIG. 14. The dashed line denotes the forth-traveling light and the solid line denotes the back-traveling light. The forth-traveling light is incident on the side surface of the optical wave guide 201 at an incident angle δ and repeats total internal reflections to be guided to the other end portion 201e. The back-traveling light is reflected at the other end portion 201e and again repeats total internal reflections at an incident angle δ to be guided to the light source side. The forth-traveling light and back-traveling light are incident on the side surface of the optical waveguide 201a at the same incident angle, each of which has the same light path length T3 for one period. In the comparative example, the light path length of the forth-traveling light is the same as that of the back-traveling light.

Figure 16:
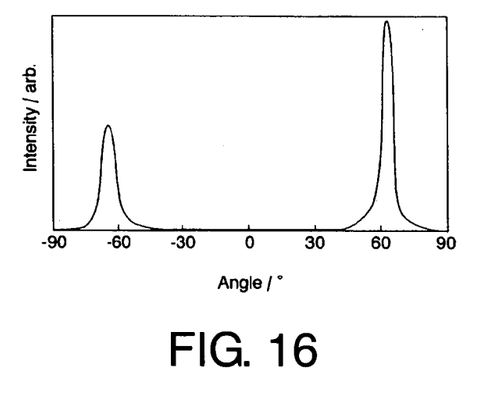
FIG. 16 is a view showing angular dependence of an extracted light intensity due to the optical simulation according to the comparative example.

FIG. 16 is a view showing angular dependence of an extracted light intensity due to an optical simulation employing the display element 200 mentioned above to provide a light receiving element to the side of the optical waveguide 201 as well as in FIG. 10. FIG. 13 showing the angular dependence of the extracted light intensity in this embodiment will be compared with FIG. 16 in the comparative example in order to examine the effect of this embodiment. The comparison will be described below.

In the positive ψ region of the forth-traveling light, both the embodiment and the comparative example have mostly the same angular dependence of the extracted light intensity. On the other hand, regarding the negative ψ region of the back-traveling light, integration of the extracted light intensity in the negative region leads to the result that the integrated light intensity of the embodiment is 1.8 times that of the comparative example. This result shows that it is possible to enhance the extracted light intensity for the back-traveling light.

Alternatively, the other end portion of the optical waveguide may be covered partially or totally with a highly reflective aluminum or silver film in this embodiment.

In the second embodiment, the optical waveguide has a columnar light-guiding part. When the light-guiding part is a rectangular column, the other end portion 1e can employ a shape which is formed of 3 truncated pyramids stacked along their central axes. That is, the other end portion 1e includes a first truncated pyramid, a second truncated pyramid, and a third truncated pyramid. The first truncated pyramid has the side p on its rectangular bottom face and the sides o, q on its side surface. The second truncated pyramid has the sides n, r on its side surface. The third truncated pyramid has the sides m, s on its side surface. Even in such an optical waveguide, the incident angle of the back-traveling light incident on the side surface of the optical waveguide can be reduced, thereby allowing it to enhance the light extraction efficiency.

Furthermore, the embodiment employs a member to generate a volume increase due to ferroelectricity as the light-extracting portion when a voltage is applied to the member. Alternatively, the embodiment may employ another member to generate the volume increase due to a different mechanism or principle as the light-extracting portion.

Second Embodiment

A display element according to a second embodiment will be explained below.

Figure 17:
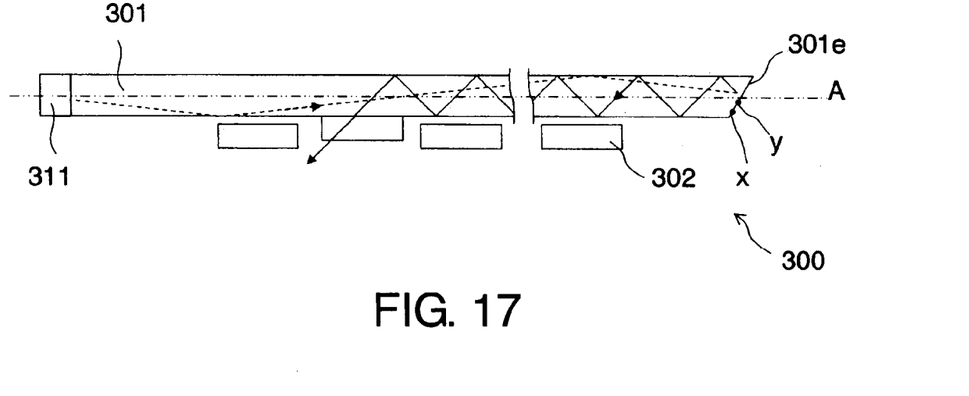
FIG. 17 is a view schematically showing a section of a display element according to a second embodiment.

FIG. 17 is a view schematically showing a section cut in a longitudinal direction of a display element 300.

The display element 300 is provided with a light source 311, an optical waveguide 301 of which one end faces one end of the light source 311 to guide light therefrom, and a light-extracting portion 302 formed near the side surface of the optical waveguide 301.

The display element 300 differs from the display element of the first embodiment in the shapes of one end (one of the two ends) and the other end portion 301e (the other of the two ends) of the optical waveguide 301. That is, the end face of the light source 311 is perpendicular to the side surface of the optical waveguide 301. Moreover, the other end portion 301e is inclined to a plane perpendicular to the side surface of the optical waveguide 301. The other end portion 301e is provided with a highly reflective aluminum or silver film to be prepared, e.g., using a plating method etc. An angle between the other end portion 301e and the plane perpendicular to the side surface of the optical waveguide 301 is denoted by $\zeta$. Moreover, an optical guiding tube is not provided to the display element 300, and one end face of the optical waveguide 301 and the light source 311 are made to be in contact with each other. Moreover, other compositions are the same as those of the first embodiment. In addition, the dashed line denotes the forth-traveling light and the solid line denotes the back-traveling light in FIG. 17. FIG. 17 shows a state where the back-traveling light is extracted out of the optical wave guide 301 via the light-extracting portion 302 in contact with the side surface of the optical waveguide 301.

Figure 18:
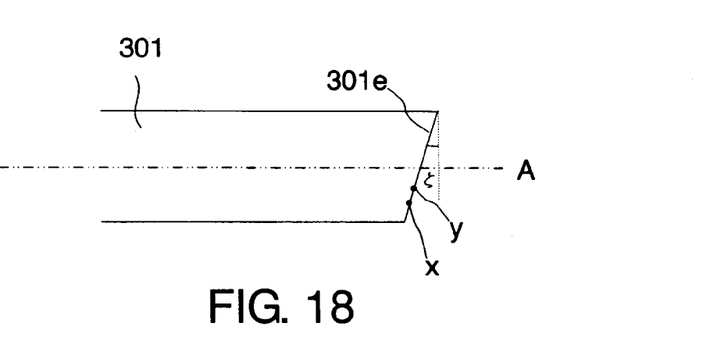
FIG. 18 is an enlarged view showing a section of other end portion of an optical waveguide according to the second embodiment.

FIG. 18 is an enlarged view showing a section of the other end portion 301e. Here, in the inclined face of the other end portion 301e, x denotes a point nearer the light source 311 and y denotes a point farther from the light source 311. When the points x and y are compared with each other, the point x is farther from the axis A of the optical waveguide 301. In other words, a sectional area passing through the point x and being perpendicular to the axis A is larger than a sectional area passing through the point y and being perpendicular thereto.

Figure 19:
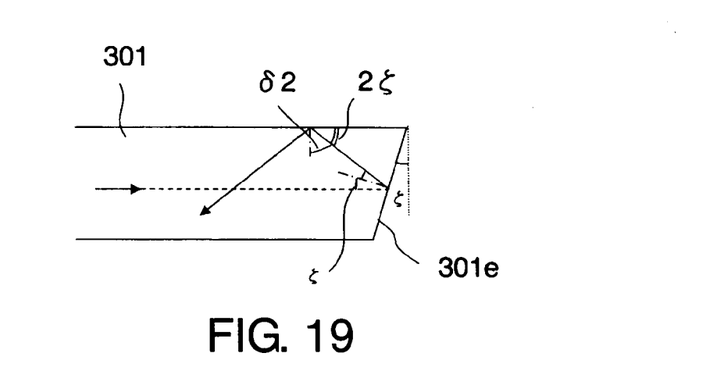
FIG. 19 is a view showing an example of another light path at the other end portion of the optical waveguide according to the second embodiment.

FIG. 19 is a view showing another example of a light path of the back-traveling light due to the reflection of the forth-traveling light which is parallel to the axis A and is reflected at the other end portion 301e. The light source 311 is directly in contact with the perpendicular end face of the optical waveguide 301. Therefore, when a light source having directivity as shown in FIG. 11 is employed as the light source 311, light traveling parallel to the axis A denoted by the dotted line shown in FIG. 19 has a maximum intensity. Forth-traveling light reaches the other end portion 301e without undergoing total internal reflections at the side surface of the optical waveguide 301 to undergo a mirror reflection at the inclined face of the other end portion 301e. The mirror reflection of the forth-traveling light makes back-traveling light whose reflection angle is $\zeta$ at the inclined face 301e. The back-traveling light is incident on the side surface of the optical waveguide 301 at an incident angle of $90°-2\zeta$ to undergo a total internal reflection at the side surface thereof. When the other end portion in the second embodiment has a shape similar to that of the comparative example (FIG. 14) in the first embodiment, back-traveling light due to forth-traveling light parallel to the axis A also travels parallel thereto without being incident on the side surface of the optical waveguide 301. However, the other end portion 301e in the second embodiment allows the back-traveling light to be incident on the side surface of the optical waveguide 301 to be reflected thereat.

In addition, in this embodiment, the light source 311 is in contact with a face of the optical waveguide 301, the face being perpendicular to the longitudinal direction thereof. The simple structure of the contact between the light source 311 and the optical waveguide 301 simplifies a manufacturing process of a display element.

Figure 20:
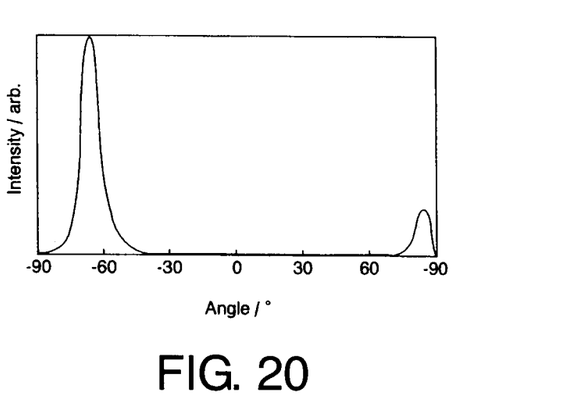
FIG. 20 is a view showing angular dependence of extracted light intensity according to the second embodiment.

In order to verify the effect of the second embodiment, an optical simulation is carried out as well as in the first embodiment. Here, the second embodiment is different from the first embodiment in both the end faces of the optical waveguide 301 and in the contact between the optical waveguide 301 and the light source. All the other parts are the same. For example, the arrangement of the light receiving element and the directivity of the light source 311 are the same as those in FIG. 10 and FIG. 11. FIG. 20 is a view showing angular dependence of extracted light intensity to be detected by a light receiving element. The horizontal axis denotes the angle $\psi$ in FIG. 10.

Figure 21:
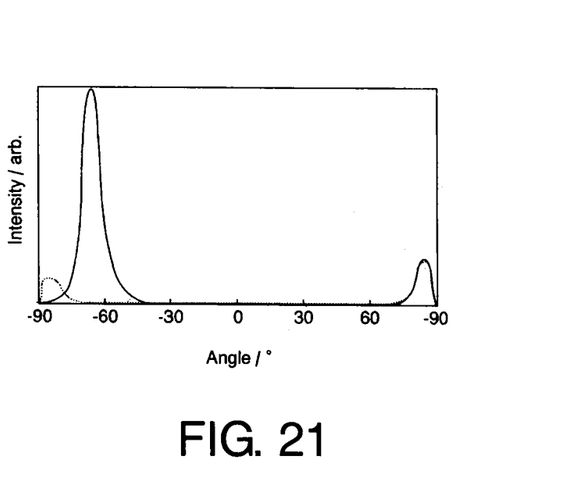
FIG. 21 is a view showing angular dependence of extracted light intensity according to a comparative example of the second embodiment.

In FIG. 20, the other end portion 301e is inclined at an angle $\zeta$ so that $\tan \zeta = 0.25$. Moreover, another optical simulation is carried out for the shape of the other end portion shown in FIG. 14 which has the other end face perpendicular ($\zeta=0$) to the longitudinal direction of the optical waveguide 301. This additional simulation is added in FIG. 20 as denoted by the dotted line in FIG. 21. A comparison between the solid line and the dotted line in FIG. 21 shows that both the extracted light intensities denoted by the solid and dotted lines are mostly the same in the positive region, i.e., for the forth-traveling light in FIG. 21. In contrast, the light intensity denoted by the solid line is higher than that denoted by the dotted line when the other end portion 301e satisfies $\tan \zeta=0.25$. The integrated intensity for $\tan \zeta=0.25$ is about 7.2 times that for $\zeta=0$.

In this way, the second embodiment having such a shape of the other end portion 301e enables it to enhance the light extraction efficiency from the optical waveguide 301 as well as the first embodiment.

While a certain embodiment of the invention has been described, the embodiment has been presented by way of examples only, and is not intended to limit the scope of the inventions. Indeed, the novel elements and apparatuses described herein may be embodied in a variety of other forms; furthermore, various omissions, substitutions and changes in the form of the methods described herein may be made without departing from the spirit of the invention. The accompanying claims and their equivalents are intended to cover such forms or modifications as would fall within the scope and spirit of the invention.

What is claimed is:

1. A display element comprising:
   a light source;
   an optical waveguide including two ends and a side surface, a first of the two ends being nearer the light source to be irradiated with light of the light source, a second of the two ends being farther from the light source, the side surface extending from the first end so that the optical waveguide guides forth-traveling light undergoing total internal reflections at the side surface from the first end to the second end and back-traveling light undergoing total internal reflections at the side surface from the second end to the first end; and
   a light-extracting portion to be provided near the side surface to extract light out of the optical waveguide,
   wherein
   the second end includes a first circular truncated cone of which a cross-section perpendicular to a longitudinal direction of the side surface is smaller when the cross-section is farther from the light source, and changes a light path of the forth-traveling light so that an incident angle of the back-traveling light to totally reflect at the side surface is smaller than the incident angle of the forth-traveling light to totally reflect at the side surface,
   the second end has a pillar portion nearer the light source than the first circular truncated cone,
   the second end has a second circular truncated cone nearer the light source than the pillar portion,
   a cross-section of the second circular truncated cone is larger when the cross section is farther from the light source,
   the cross-section is perpendicular to the longitudinal direction.

2. The display element according to claim 1, wherein the second end enables total internal reflections or mirror reflections.

3. The display element according to claim 2, wherein
a distance between a first point on a buss of the first circular truncated cone and an axis passing through a center of a cross-section of the side surface is longer than a distance between a second point on the buss and the axis, the first point is nearer the light source than the second point, the cross-section is perpendicular to the longitudinal direction, the axis is parallel to the longitudinal direction.

4. A display device comprising a plurality of display elements of claim 3,
wherein respective longitudinal directions of the plurality of display elements are aligned in parallel.

5. A display device comprising a plurality of display elements of claim 2,
wherein respective longitudinal directions of the plurality of display elements are aligned in parallel.

6. A display device comprising a plurality of display elements of claim 1,
wherein respective longitudinal directions of the plurality of display elements are aligned in parallel.

* * * * *